United States Patent [19]
Wiehl

[11] 3,753,282
[45] Aug. 21, 1973

[54] MEMBER FOR USE IN THE SHAPING OF COIL ENDS OF STATOR WINDINGS DISPOSED IN SHEET METAL STATOR ASSEMBLIES OF ELECTRICAL MACHINES

[75] Inventor: Klemens Wiehl, Nuernberg, Germany

[73] Assignee: Siemens Aktiengesellschaft, Berlin & Munich, Germany

[22] Filed: Mar. 3, 1972

[21] Appl. No.: 231,483

[30] Foreign Application Priority Data
Mar. 15, 1971 Germany.................. G 71 09 670.3

[52] U.S. Cl............................ 29/205 D, 29/421
[51] Int. Cl...................... H02k 15/00, B23p 17/00
[58] Field of Search...................... 29/205 D, 421 M, 29/421, 205 R

[56] References Cited
UNITED STATES PATENTS
3,156,037  11/1964  Warner.......................... 29/205 C Primary Examiner—Thomas H. Eager
Attorney—Carlton Hill et al.

[57] ABSTRACT

A member for use in the shaping of coil ends of stator windings disposed in sheet metal stator assemblies of electrical machines employing a hollow body member which carries at least one, preferably a plurality of radially extensive and retractable arms which may be moved radially outwardly, for example, by means of an axially movable plunger engageable with such arms whereby the same may be disposed in close relation to the ends of the coil to be formed, at least the outer portions of such arms comprising a material of good electrical conductivity with the radial thickness of such material corresponding at least to the depth of penetration of induced eddy currents resulting from current flow through the winding, induced, for example, by a capacitive discharge.

5 Claims, 3 Drawing Figures

MEMBER FOR USE IN THE SHAPING OF COIL ENDS OF STATOR WINDINGS DISPOSED IN SHEET METAL STATOR ASSEMBLIES OF ELECTRICAL MACHINES

BACKGROUND OF THE INVENTION

The invention is directed to a shaping member for use in the electromagnetic shaping of the coil ends of stator windings of electric motors and the like, employing sheet metal stator assemblies, in which type of operation a shaping member is disposed in adjustable relation at opposite sides of the stator core assembly and extending in substantially axial direction relative to the coil structure. The inserted shaping members are maintained in insulated relation with respect to the coil ends and eddy currents are induced in the shaping member by an impulse in the form of a capacitive discharge over the stator windings so that electrodynamic forces occurring between the shaping member and the coil ends produce forming forces on such coil ends to deform or deflect the same to the desired positions.

The stator windings of electro motors and similar equipment are generally suitably disposed in respective slots formed in the stator core assembly, such operations being performed either by hand or mechanically. The ends of the inserted coil protrude beyond the end faces of the stator assembly for a comparatively long and undesirable distance, whereby for practical reasons of construction, particularly in order to keep the length of the motor as small as possible, a suitable deformation of the coil ends is required. As the windings are normally inserted or drawn into the associated stator slots in the form of several sections sequentially assembled, the coil ends of previously inserted windings must be suitably formed in such a way that the adjacent open slots are readily accessible for the assembly of additional windings. Consequently, a simple flattening deformation of the coil ends to adjacent the stator core assembly is insufficient as the open ends of the adjacent slots which must be freely exposed, would in such case be either partly or entirely covered by the deformed coil ends. Consequently, in addition, to a flattening deformation of each coil end, the latter preferably must be azimuthally shaped, i.e., bent or deflected radially outward with respect to the motor axis, hereinafter generally designated as "deflected." In the past, the deformation as well as the deflection of the coil ends was effected by hand, using a hammer or mallet, or by means of a power press. However, these procedures, in addition to being very time consuming, have the further disadvantage that such type of shaping of the coil ends presents severe problems with respect to insulation damage on the wire forming the winding, as the forces must be applied to the portions of the wire conductor forming the outer coils and transferred from wire to wire with the development of large frictional forces between individual turns of wire.

A method is also known for the electro-magnetic shaping of coil ends in which suitably adjustable shaping members are disposed at opposite sides of the stator assembly and extend in axial direction between the coil ends, which members are constructed of good electrically conductive material with the members being inserted adjacent the coil ends but in insulated relation with respect thereto. In this procedure, current impulses resulting from the discharge of a capacitor are conducted through the stator windings with the magnetic fields thus created in the stator windings inducing eddy currents in the shaping members. As a result of electrodynamic forces occurring between the shaping members and the coil ends, the latter are deformed. In this case, however, the deformation of the coil ends is achieved by axial adjustment of the shaping member and the utilization of several capacitor discharges, as well as by the shape of the shaping members. In order to deflect the coil ends azimuthally and thereby expose the adjacent slots for reception of a subsequent winding, the shape of the shaping member must be varied correspondingly by utilization of additionally mounted shaping members which likewise are constructed from a good electrically conductive material.

This prior arrangement has the disadvantage that relatively short coil ends in particular cannot always be so deformed that while an axial decrease is effected, exposure, if any, of the adjacent slots is insufficient to permit the next winding to be fully inserted within the cooperable slot.

The present invention is therefore directed to the problem of improving shaping members of the type employed with said prior method whereby effective and efficient deformation of the coil ends, in particular short coil ends as well as the longer ends is so achieved that the adjacent slots of the stator assembly are fully exposed for reception of the next winding.

BRIEF SUMMARY OF THE INVENTION

The problem is solved in accordance with the present invention by constructing the shaping member as a hollow structure, preferably cylindrical, and providing the same with one or more openings extending through the side wall thereof in which a suitable arm or jaw is slidably carried therein for radial extension and retraction from the hollow member, such arms or jaws being adapted to be suitably retained in operative position and having at least the outer portions thereof composed of a good electrically conductive material with the thickness of such conductive material corresponding at least to the depth of penetration of any induced eddy currents during usage.

In an especially advantageous embodiment of the invention, the shaping member is provided with a generally conical front or leading portion and the hollow member is provided with a suitable plunger or the like which is slidably carried within the hollow member and provided with inclined surfaces adapted to engage the inner end portions of the slidable arms or jaws, operative to move such arms radially outward and prevent undesired retraction thereof.

BRIEF DESCRIPTION OF THE DRAWINGS

In the drawings wherein like reference characters indicate like or corresponding parts.

DETAILED DESCRIPTION OF THE INVENTION

Figure 1:
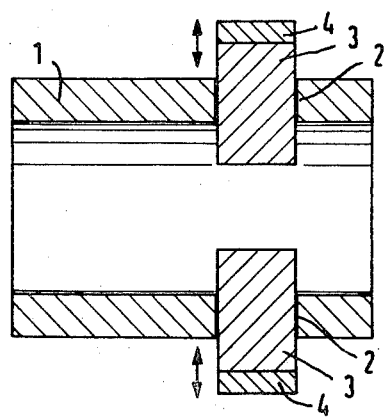
FIG. 1 is a longitudinal section through a simple form of shaping member constructed in accordance with the present invention.

Referring to FIG. 1, there is illustrated a shaping member, according to the invention, comprising a cylindrical hollow body member 1 having a plurality of circumferential openings 2 therein in which are disposed respective radially extending slidable arms or jaws 3 which are adapted to be suitably retained in that desired adjusted positions. The arms 3 can be moved by any suitable means, for example, pneumatic, hydraulic or mechanical forces acting on the arms in the direction of the double arrows. The hollow member 1 may consist, for example, of metal or of other suitable rigid material with the arms 3 preferably composed of steel. Disposed at the outer portions of the arms 3 is a layer 4 of good electrically conductive material which has a thickness which at least corresponds to the depth of penetration of the induced eddy currents involved.

Initially, the arms or jaws are retracted until the outer faces thereof are substantially coextensive with the outer surface of the member 1, in which condition the member is inserted between the coil ends of the stator windings. Following insertion the arms or jaws 3 are then extended, by the particular means provided therefor, until they abut the coil ends and while retained in such position a current is passed through the stator winding as a result of a capacitor discharge. The resulting magnetic field produced in the stator windings thereby induces eddy currents into the layer 4 of the arms 3 creating electrodynamic forces acting in repulsion on the coil ends and thus deforming them and deflecting them towards the stator assembly.

Figure 2:
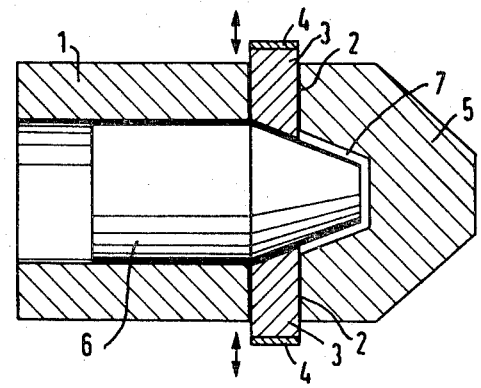
FIG. 2 is a similar sectional view illustrating a preferred embodiment of the invention.
Figure 3:
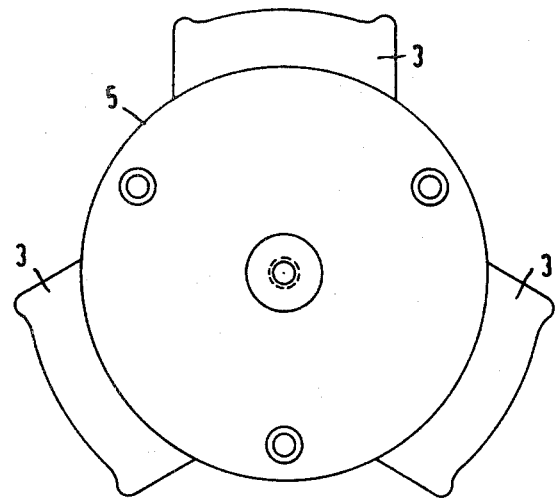
FIG. 3 is a front elevational view of a structure constructed according to FIG. 2, illustrating the respective arms in extended positions.

FIG. 2 illustrates a particularly preferred embodiment of the invention in which the shaping member is provided with a conical end portion 5 disposed at the front or leading end of the member 1, and constructed for example of copper, which may be secured to the member 1 by suitable means, as for example screws. In this instance the hollow member 1, for example, conveniently may be constructed of brass. Disposed within the bore of the hollow member 1 is a suitable plunger 6, constructed, for example, of steel and arranged for axial sliding movement within the member 1. The inner end of the plunger 6 may be provided with suitably inclined surfaces as for example a conical surface 7 adapted to engage complimentary inclined surfaces formed on the inner ends of the respective arms 3. In the embodiment illustrated, the outer portions 4 of the arms 3 are likewise constructed from a good electrically conductive material, as for example copper.

Initially, the plunger 6 is in a position adjacent the free outer end of the bore of the hollow member 1 whereby the conical end of the plunger is at its most remote point from the conical end portion 5, with the arms or jaws 3 in their retracted positions. Thus by moving the plunger inwardly, the arms 3 may be cammed by the conical portion 7 of the plunger in outward directions to the positions illustrated. The outer surfaces of the arms 3 and adjacent portions of the hollow member 1, particularly the conical portion 5 thereof, are suitably covered with an insulating layer, for example, a suitable applied and sintered-on layer of non-conductive material.

In use, the shaping member is suitably disposed at the coil ends in the same general manner as heretofore described and following extension of the arms or jaws 3 to a point where they touch the adjacent coils, the desired current discharge is effected through the stator windings, for example by a capacitive discharge, to effect the desired deformation and deflection.

Having thus described my invention it will be obvious that various immaterial modifications may be made in the same without departing from the spirit of my invention.

I claim:

1. A shaping member for the electro-magnetic shaping of coil ends of stator windings of electric motors and the like disposed in sheet metal stator assemblies in which a shaping member is adapted to be disposed in adjustable relation at each side of the stator assembly between the coil ends and inserted in axial direction with respect thereto, in insulated relation with respect to the coil ends, and by means, for example, of a capacitive discharge a current impulse is conducted over the stator winding to induce eddy currents in the shaping member to create electrodynamic forces between the shaping member and the coil ends operative to effect a desired deformation and deflection of such coil ends, in which the shaping member comprises a hollow body having at least one circumferential opening therein, a radially movable arm disposed in each such opening and extensible and retractable relative to the body member, at least the outer portions of the respective radially extending arms comprising a good electrically conductive material having a radial thickness corresponding at least to the depth of penetration of the induced eddy currents.

2. A shaping member according to claim 1 comprising in further combination, an actuating member for said arms in the form of a plunger slidably carried in the bore of the hollow body and provided with a tapering inner end portion adapted to engage the adjacent inner ends of the radially disposed arms whereby axial displacement of the plunger is operable to move said jaws in radially outward direction.

3. A shaping member according to claim 1, wherein said shaping member is of cylindrical configuration.

4. A shaping member according to claim 3, wherein said body member has at one end thereof a conical shaped end portion forming the leading end of the member and constructed of a good electrically conducting material.

5. A shaping member according to claim 4 comprising in further combination, an actuating member for said arms in the form of a plunger slidably carried in the bore of the hollow body and provided with a tapering inner end portion adapted to engage the adjacent inner ends of the radially disposed arms whereby axial displacement of the plunger is operable to move said jaws in radially outward direction.

* * * * *